(12) United States Patent
Duke et al.

(10) Patent No.: US 12,145,803 B1
(45) Date of Patent: Nov. 19, 2024

(54) ITEM AND CONTAINER TRACKING WITH TASK PLANNING

(71) Applicant: Amazon Technologies, Inc., Seattle, WA (US)

(72) Inventors: Jeremy Paul Duke, Gilbert, AZ (US); Charles A Carman, Lake Forest Park, WA (US)

(73) Assignee: Amazon Technologies, Inc., Seattle, WA (US)

(*) Notice: Subject to any disclaimer, the term of this patent is extended or adjusted under 35 U.S.C. 154(b) by 792 days.

(21) Appl. No.: 17/353,526

(22) Filed: Jun. 21, 2021

(51) Int. Cl.
| | |
|---|---|
| *B65G 1/137* | (2006.01) |
| *B25J 9/16* | (2006.01) |
| *B65G 47/90* | (2006.01) |
| *G06Q 10/02* | (2012.01) |
| *G06Q 10/083* | (2023.01) |
| *G06Q 10/087* | (2023.01) |

(52) U.S. Cl.
CPC .......... *B65G 1/1378* (2013.01); *B25J 9/1664* (2013.01); *B25J 9/1687* (2013.01); *B65G 1/1371* (2013.01); *B65G 47/905* (2013.01); *G06Q 10/02* (2013.01); *G06Q 10/0838* (2013.01); *G06Q 10/087* (2013.01)

(58) Field of Classification Search
CPC .. B65G 1/1378; B65G 1/1371; B65G 47/905; B25J 9/1664; B25J 9/1687
See application file for complete search history.

(56) References Cited

U.S. PATENT DOCUMENTS

| | | | |
|---|---|---|---|
| 11,602,847 B2 * | 3/2023 | Kattepur | B25J 9/1664 |
| 2018/0364719 A1 * | 12/2018 | Wang | G06F 16/22 |
| 2020/0005162 A1 * | 1/2020 | Kattepur | B25J 9/1612 |
| 2020/0223066 A1 * | 7/2020 | Diankov | B25J 9/1679 |
| 2021/0049037 A1 * | 2/2021 | Kattepur | B25J 9/1664 |
| 2021/0395008 A1 * | 12/2021 | Zheng | G06Q 10/087 |
| 2022/0126445 A1 * | 4/2022 | Zhu | B25J 9/1635 |
| 2022/0331962 A1 * | 10/2022 | Pirk | G06F 18/24143 |

* cited by examiner

*Primary Examiner* — Kyle O Logan
(74) *Attorney, Agent, or Firm* — Kilpatrick Townsend & Stockton LLP (57) ABSTRACT

A method and system for tracking and determining completion of sub-tasks to ensure completion of an overall task related to an item are described. The method and system receive item information describing a particular item to be acted upon and a task to complete with the item, such as assembly or shipping of the item. One or more intermediate states of the item are determined based on a process for transitioning to the final completed state. One or more intermediate tasks are determined to accomplish the transition to the completed state. The instructions for completing the tasks are then generated and conveyed for completion.

20 Claims, 8 Drawing Sheets

ITEM AND CONTAINER TRACKING WITH TASK PLANNING

BACKGROUND

Transportation, logistics, and production systems involve producing and delivering items and products through various steps or stages. For production systems, various tasks are performed to produce the item. For logistics systems, packages are moved in various compound containers around the world to efficiently bring those packages to customers. Physical containers may be nested (e.g., a package in a bag, that bag in a cart, that cart in a pallet, etc.) and such structures have long been used for shipping efficiency. Tracking, identifying, and automating tasks required for each item may prove difficult because of the nested nature or requirements of such procedures.

BRIEF DESCRIPTION OF THE DRAWINGS

Various embodiments in accordance with the present disclosure will be described with reference to the drawings, in which.

DETAILED DESCRIPTION

Techniques described herein include systems for tracking item state and item progression through a production or fulfillment system including determining intermediate steps required for the item to progress from a current state and location to a final destination and final state. Once the intermediate steps are identified, sub-steps and additional processes required for completing the processing are determined. Such sub-processes are used to control systems, such as assembly lines, robotic transport equipment, automated manufacturing, automated packing, and other production and logistics related systems. The states for the item may include states from unpacked states, packed states, shipping states, assembly states, inspection states, and other states, positions, locations, or descriptions of the item.

The systems and methods described herein are described with respect to logistics and fulfillment systems for delivering items to destinations, for example to fulfill customer orders, though the systems and processes described herein may be used for tracking logistic systems, inventory systems, manufacturing lines, and other such item handling systems that involve items in different states as they progress through a procedure.

In a particular example, a logistics system may be implemented for delivering packages and items to customers based on customer orders. The logistics system may receive customer orders through a portal such as a website or catalog ordering system. When an item is ordered, the item needs to go through several processes to prepare the item for shipment and delivery to a final delivery destination. The logistics system determines, based on the delivery destination and a route of shipping containers, a nesting of packages such as bags, pallets, and shipping containers, that are used to route the item to a delivery station where it is dispatched for final delivery. The logistics system determines that the item is to be packaged, e.g., in a parcel container, and then identifies a machine or system for packaging the item, and the steps required to route the item to the packaging system. Once packaged, the item is routed to packing within larger containers including multiple parcels and nesting within other physical assemblies, such as bags and containers, which have additional steps and procedures associated shipping from a shipping center. The steps required for each item in order to complete the delivery may be displayed for completion and tracking and may be used as an audit log to track different procedures completed with respect to the item. The steps and procedures may include steps for preparing a shipment, and may also include steps and procedures required to complete shipment, such as different customs and inspections required. The logistics system and corresponding methods provide for management of a workflow as well as dynamic adjustment of a workflow based on different containers and components required to prepare the item for shipment and delivery.

In some examples, the logistics system will control one or more automated systems to complete one or more of the tasks in an automated manner. For example, a packaging machine, pallet jack, container crane, and other such item handling equipment may be controlled by a fulfillment center computing system based on the identified intermediate tasks to accomplish the overall item task and deliver the item to the delivery destination. In some examples, the logistics system may automatically reserve equipment needed to complete the future task for a time window when the task is expected for completion.

In a second example, the systems and methods described herein may be used with production execution systems. For instance, a frame or base component of an assembly may be identified at the start of a manufacturing process, such as an assembly line. The final item may be ordered or requested for manufacturing through a number of manufacturing steps. As the item progresses through the manufacturing steps, different equipment, tools, and sub-components that are needed to complete the assembly of the item may each be identified and routed to the assembly, including all sub-steps and ordering of the required steps. Furthermore, different equipment and sources of parts may be tracked for troubleshooting, auditing, identifying inefficiencies, and other such system-wide analysis.

The systems and methods herein provide several advantages over conventional item tracking systems and workflow management systems. Primarily, the system enables management of material, personnel, equipment, and processes in what may be a large number of potential situations and scenarios. For example, in a fulfillment center there may be items of any number of shapes, sizes, levels of fragility, and having other such varying characteristics that each item will require different tasks and equipment for proper handling to deliver. The systems and methods herein provide for coordinating equipment, materials, and personnel to complete tasks with respect to an item, when the tasks may vary from item to item and may present such a large variety of tasks that completing exhaustive checklists for every item type within the fulfillment center is cost and time prohibitive. The system is also able to communicate with additional systems to instruct completion of tasks through robotic or other equipment, such as to move containers on pallets within a facility as required. The systems and methods herein unify systems for tracking materials, personnel, equipment, and processes and identify the interactions of each of the four systems to complete a particular item task, such as assembling a widget or delivering a package to a customer. The various systems are managed to identify all needed system elements, what tasks are required by each, the nesting of various tasks including ordered completion of steps, and identify inefficiencies or down-time. The systems and methods herein provide for an auditing system to track every step of the process and identify sources of potential error or mistakes and troubleshoot problems in the system.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Figure 1:
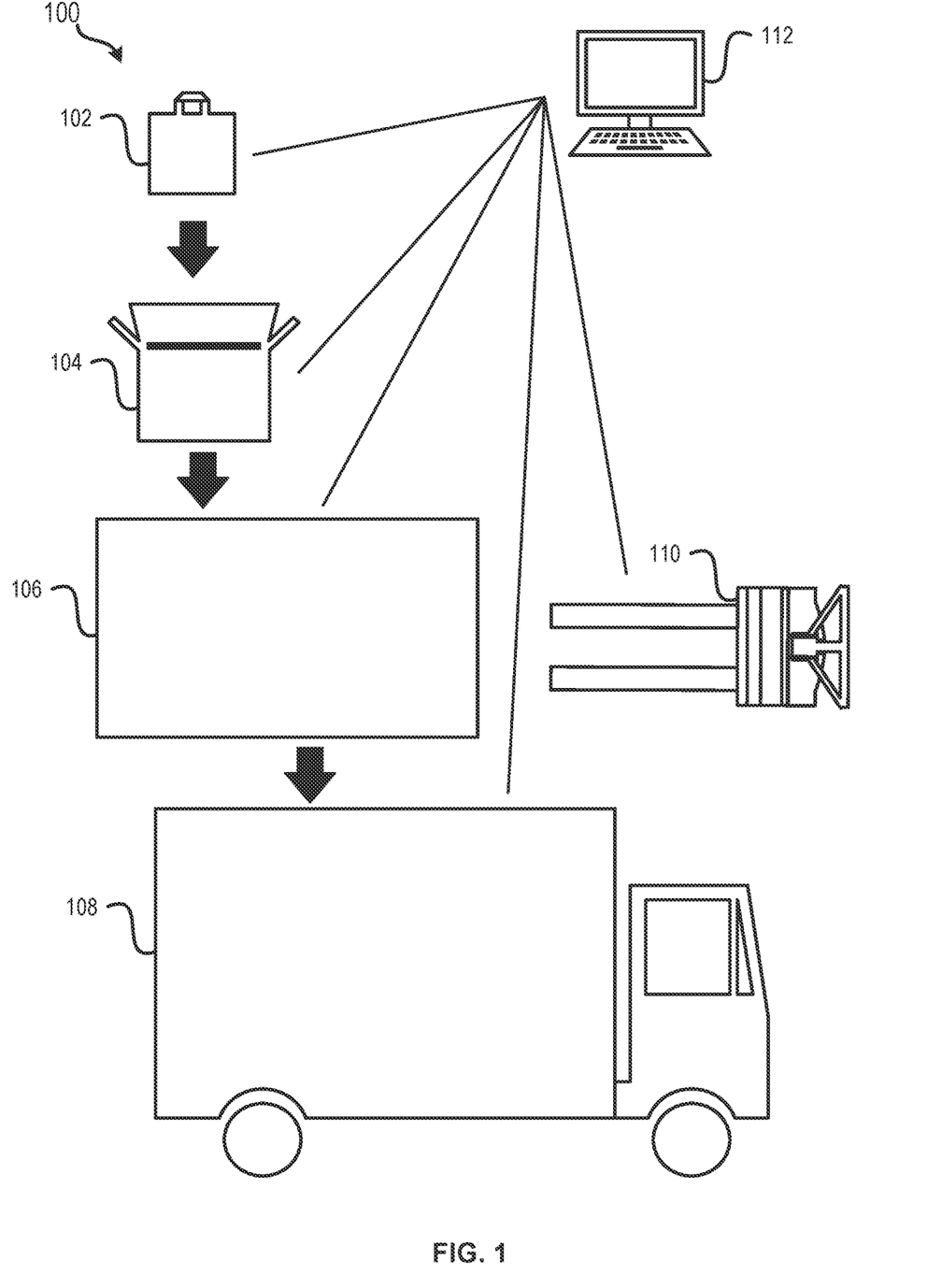
FIG. 1 depicts a system view of items stored in nested containers for processing and delivery to a destination, according to at least one example.

Turning now to the figures, FIG. 1 depicts a system 100 of items stored in nested containers for processing and delivery to a destination, according to at least one example. In the system 100, an item 102 may be nested within a box 104 which may be stored within a pallet box 106 and loaded on a delivery vehicle 108 for transport from a fulfillment center to a delivery station where the item 102 may be removed from the container 106 for distribution from the delivery station to the final destination. The delivery station is a hub where large shipping containers are received from the facility, the delivery station nearer to at least one delivery region, and is used for staging and final distribution of parcels onto delivery vehicles to go out to individual customers. Other elements of the system 100 include a computing device 112 which may be embodied in a distributed computer system or a system-wide network or other such computing device as well as various equipment 110 usable to perform actions with respect to the item 102 and/or one or more containers such as the box 104 or the container 106.

Figure 2:
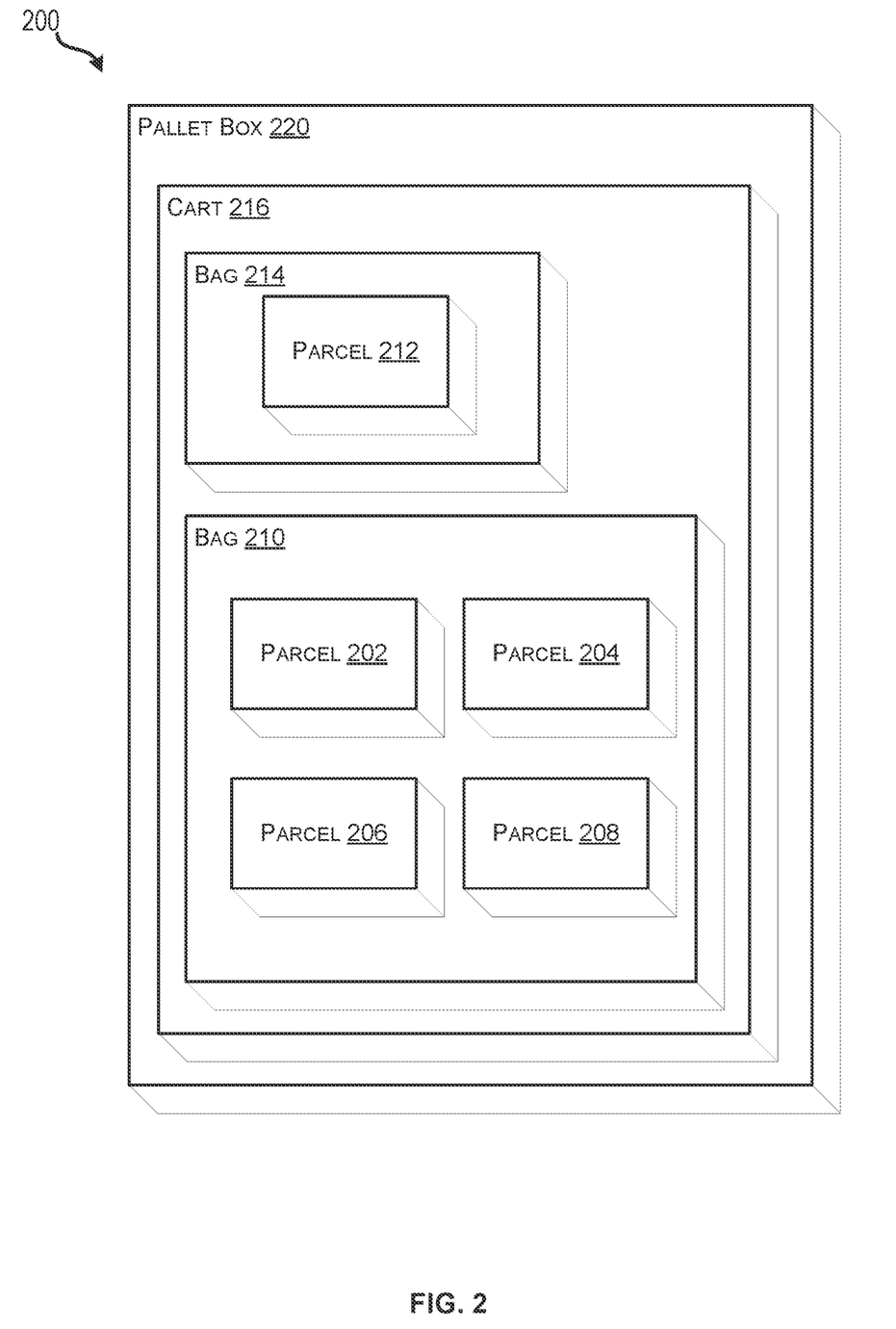
FIG. 2 depicts a nested architecture of parcels within various containers as part of a logistics system, according to at least one example.

The system 100 focuses on executing tasks with respect to items and tasks to ultimately reach a final destination and perfect delivery to a consumer. In an e-commerce setting, items and packages may be stored at a facility, such as a fulfillment center, from which items are distributed for delivery. The system 100 tracks items and containers within the facility to track inventory and ensure packages and items are being delivered to fulfill customer orders. Each item or container may have different attributes or states that describe the properties of the item 102, the readiness for shipment, the current location, and other such information. As the item 102 and the box 104 and container 106 travel through the facility and are packed with items to transport to a delivery station (e.g., a location that is positioned near the final destination for the items inside the container), the system 100 tracks work and tasks performed on and upcoming for each item and container. With many items nested within other containers, as shown in FIG. 2, the tracking of tasks to complete as well as tracking of item locations and remaining tasks to complete before delivery of items becomes increasingly complex. By tracking the state and location of all items and containers, the system 100 provides a view into the state of operations within the facility and serves as a central hub to organize, troubleshoot, audit, and refine operations within the facility including personnel, equipment, inventory, and logistics.

The system 100 relies on an established rule base to provide a basis for determining tasks required to process items through the facility and deliver the items outside the facility. In order to use space and time within the facility efficiently the items 102 are packed from the smallest container up to a largest container, resulting in a nested arrangement, e.g., as shown in FIG. 2. As more items become involved, the tasks that must be completed and that must occur before shipment become more complex. For instance, shipping a single item may require only a few limited steps such as packing, labeling, and re-locating to a delivery vehicle. However, due to the large scale of operations for delivery performed at such facilities, items are frequently packed, then loaded into larger containers, which may then further be loaded within other containers for delivery to a staging location from which they are dispatched after unloading. By providing visibility into the operations involved, the system 100 enables simplification of tracking and additional data for ensuring use and efficiency of all systems involved, as described above.

In operation, the system 100 identifies an item 102 and determines a task to be completed with respect to the item. An exemplary task may include delivery of the item 102 to a customer. The single delivery task, once identified, may be broken down into sub-tasks or intermediate tasks. The intermediate tasks will vary from item to item based on differences in item characteristics, delivery location, delivery route, and other such factors. The established rule base and a machine learning algorithm may be used to determine the one or more intermediate tasks and ensure proper ordering and completion of the intermediate tasks to complete the overall item task. The rule base may be based on expert-defined rules and may define operations to complete for discrete sub-tasks, for example to pack an item 102 into a box 104 before packing into a container 106 before loading onto a truck 108 with loading equipment and transporting, via the truck 108, to a delivery station. The system 100 is therefore able to identify bottlenecks, required equipment and materials, and all processes that must be completed for an item to leave on a truck 108. The rules may be expert-defined and provide associative links between item states and particular tasks and sub-tasks to be completed. The system 100 then outputs instructions for completing the intermediate tasks, outputs identifications of bottlenecks, troubleshooting of problematic stations, audit logs for every item processed, and causes one or more sub-systems to carry out one or more actions to complete the intermediate tasks and the overall task.

FIG. 2 depicts a nested architecture 200 of parcels within various containers as part of a logistics system, according to at least one example. The architecture 200 is reflective of a typical pallet box 220 that may be loaded with carts, bags, and parcels at a facility as part of a shipping operation. In other systems, the architecture 200 may represent a completed product assembled at the facility, with each sub-component identified and associated processes identified for completing the assembly.

As illustrated, a first bag 210 includes parcels 202, 204, 206, and 208 that may each contain one or more items. Each item may be part of a customer order, and each parcel may fulfill part or a whole of a customer order. The items, once stored in the facility, are packaged into the parcels, at which the state of the items is updated to reflect the physical container by associating each item with a logical container (e.g., generating logical assemblies of items to reflect their physical locations and states). Each parcel 202, 204, 206, and 208 is placed within the bag 210, and may be placed in the bag because all the parcels within the bag 210 may be destined for a similar delivery station or final delivery vehicle. Once within the bag, the logical assembly including each item is updated to reflect the current state of the item as within a parcel and further stored within the bag 210. Similarly, a second bag 214 may include a parcel 212 having one or more items inside that is identified with a particular state reflective of the physical status of the item within the parcel 212. Each of the bags 210 and 214 are loaded onto a cart 216 at the facility and the cart may be placed within a pallet box 220. The pallet box 220 may be loaded, by one or more pieces of loading equipment, into a shipping container, onto a vehicle, or in some other container. As such, each item within the pallet box 220 exists within several nested physical groups. The system 100 identifies each of the nested groups and updates the state of each item as the physical container changes (e.g., is packed or unpacked from containers) so as to track the item and track performance of tasks to ensure the parcel is delivered to the customer on time.

Figure 3:
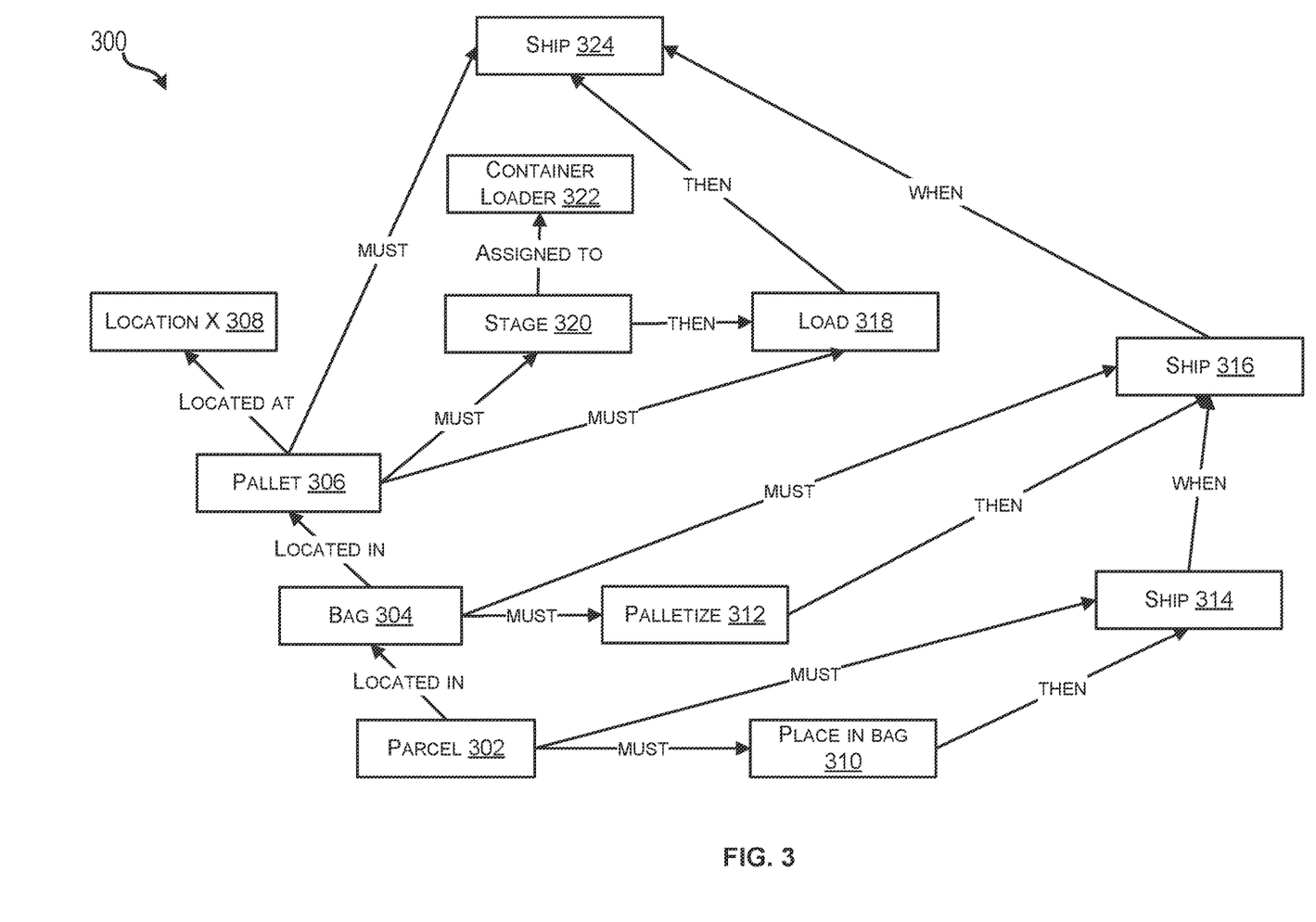
FIG. 3 depicts a logical tree architecture identifying item tasks for completing a particular procedure with respect to an item based on sequential ordering and nested architecture of physical components, according to at least one example.

FIG. 3 depicts a logical tree architecture 300 identifying item tasks for completing a particular procedure with respect to an item based on ordering and nested architecture of physical components, according to at least one example. Although some procedures and steps may be described and presented in a sequential manner, in some examples the steps and procedures may be performed in parallel or may be in sequence. The architecture 300 reflects rules and associations that may be established within the rule base and used to track tasks for items to ensure delivery of the item from the facility. The architecture 300 is reflected as a tree showing relationships, dependency, and ordering of tasks to be completed.

A parcel 302 initially includes an item, which may have already been packed in the parcel 302. The parcel 302 must ship 314 to be delivered to a customer. As part of that process, the architecture reflects that parcel 302 will be placed in a bag at task 310 and subsequently shipped 314. The parcel 302, as part of the processing within the facility, is placed within a bag 304, as reflected at task 310. The bag 304 must also ship at task 316, in order to ship the parcel 302. In order for the bag 304 to ship at 316, the bag 304 must be palletized at task 312 and then shipped. By palletizing the bag 304, the bag 304 is located within a logical structure for a pallet 306. The pallet 306 must be loaded at 318 and subsequently shipped at 324. In order to load at 318, the pallet is staged at 320, assigned to a container loader 322, and then loaded by the container loader 322 at task 318. After loading, the pallet 306 may ship. The pallet 306 is located at location x as indicated by item 308, which information may be used to generate the instructions for the container loader 322 to retrieve the pallet 306, stage at 320, and load at 318 in order for the pallet to ultimately ship.

As reflected in the architecture 300, the association of the parcel 302 within each of the bag 304 and the pallet 306 includes many additional steps and procedures to complete that involve other systems including loading systems such as packing systems and also includes equipment such as container loader 322 in addition to personnel to operate one or more pieces of equipment to accomplish the tasks of the architecture 300. By accessing the rule base, or receiving an output of a machine learning algorithm trained using a rule base, each of the intermediate tasks, such as the place the parcel 302 in a bag 304, palletize the bag 304, stage the pallet and assign it to a container loader 322 so it can be loaded for shipment are identified. Once identified, instructions for each task, and the particular ordering of each task may be generated. the instructions may include instructions provided at a display device to human operators or may include instructions to cause machines to carry out particular tasks.

Figure 4A:
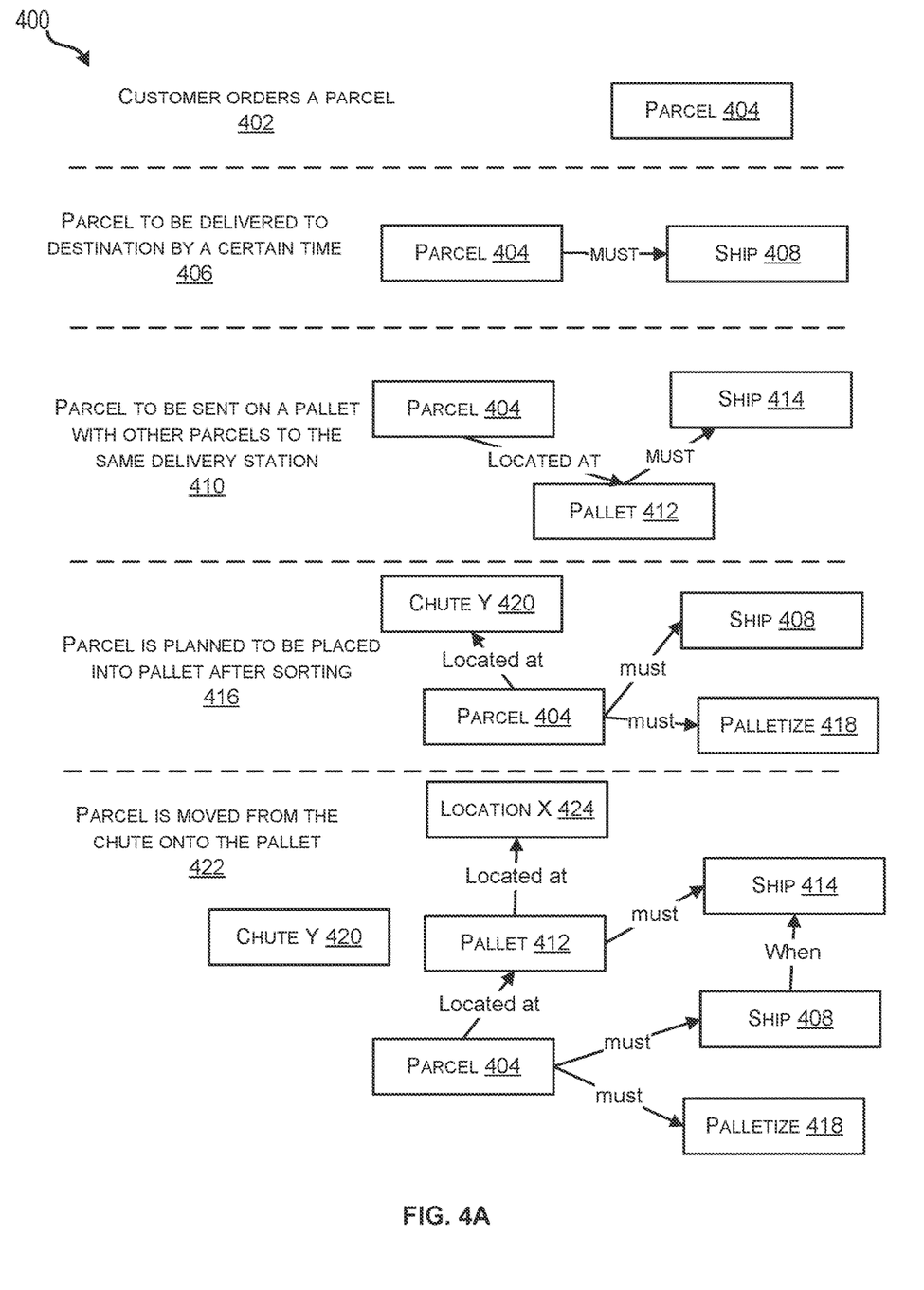
FIG. 4A depicts a sequential view of a process for determining a set of intermediate tasks for an item and building the logical tree architecture of FIG. 3, according to at least one example.
Figure 4B:
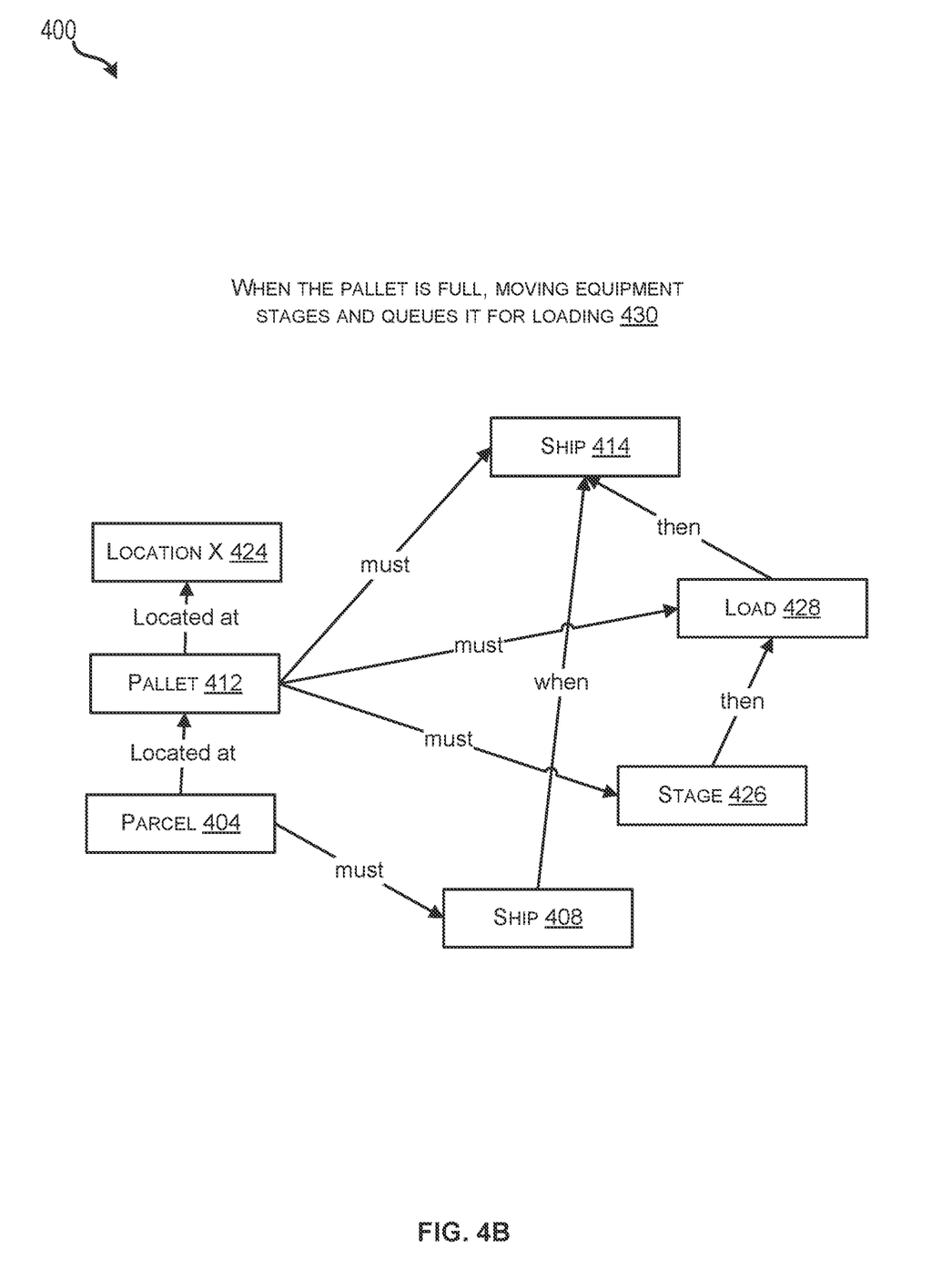
FIG. 4B continues a depiction of a sequential view of a process for determining a set of intermediate tasks for an item and building the logical tree architecture of FIG. 3, according to at least one example.
Figure 6:
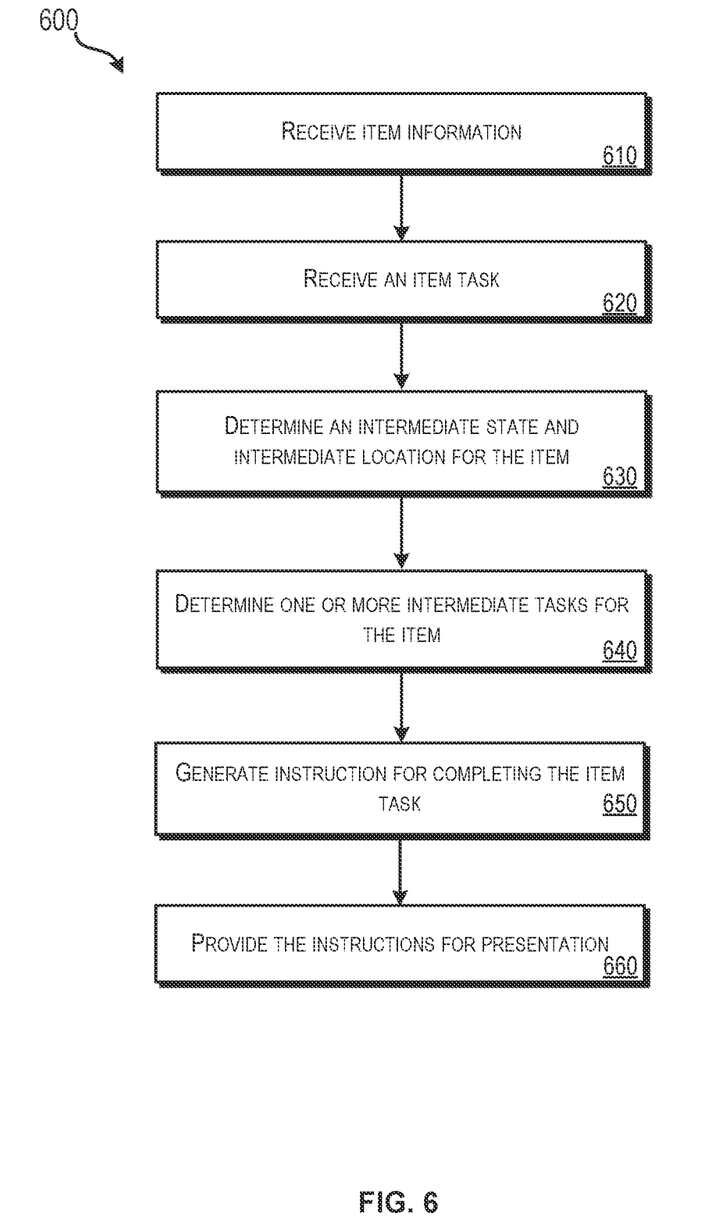
FIG. 6 depicts a block diagram depicting a method for determining intermediate tasks for a particular item and carrying out such intermediate tasks, according to at least one example.

FIGS. 4 and 6 illustrate example flow diagrams showing respective processes 400 and 600 as described herein. These processes 400 and 600 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

FIGS. 4A and 4B depict a sequential view of a process 400 for determining a set of intermediate tasks for an item and building the logical tree architecture of FIG. 3, according to at least one example. Each of the steps of FIGS. 4A and 4B are presented as single tasks that may be carried out individually, though some or all may be completed together or in multiple discrete steps. Additionally, the identification of tasks in FIGS. 4A and 4B highlight the use of a rule base, whether the rule base is directly accessed or used to train a machine learning algorithm, to determine each of the tasks to be completed. The process 400 is presented as an illustrative example of steps that may be performed and therefore is not an exhaustive listing of all possible tasks and procedures.

In some examples, the machine learning algorithm may be trained using a set of initial rules defining items and tasks to be completed with respect to items that defines intermediate tasks to complete in the process of completing the overall task. For example, the machine learning algorithm may be trained using data describing existing workflow steps for packaging an item in a parcel, packing the parcel in a container, loading the container on a vehicle, and transporting the container with a vehicle. Each of the intermediate steps, as detailed in FIGS. 4A and 4B represent data and intermediate steps that may be used for the training of a machine learning algorithm that outputs instructions for steps to complete an item task, such as delivering an item to a customer as described herein.

At 402, the process 400 includes receiving an order from a customer for an item, the item included in a parcel 404. In some examples, block 402 may be performed by the computing device 112 or the computing device 500. The customer may place the order through any means including over the internet, phone, by mail, or otherwise request the item be delivered to them from a fulfillment facility.

At 406, the process 400 includes determining that the parcel 404 will be delivered to a delivery destination by a certain time. In some examples, block 404 may be performed by the computing device 112 or the computing device 500. The delivery time may be determined based on a guarantee to a customer, an estimated shipping time, or any other suitable determination. Once the shipping event is determined, the process 400 identifies a task 408 for shipping the parcel 404.

At 410, the process 400 includes determining that the parcel 404 will be sent on a pallet 412 containing other parcels to a delivery station before final delivery. In some examples, block 404 may be performed by the computing device 112 or the computing device 500. This determination may be made based on the determination of shipping at 406, and as part of identifying that the parcel 404 is to ship, the system may determine that the process by which the parcel 404 will ship includes locating the parcel 404 on a pallet 412 for shipping at task 414 when the pallet is shipped.

At 416, the process 400 includes determining that for the parcel 404 to be located on the pallet 412 it must be placed into the pallet 412 after sorting. In some examples, block 404 may be performed by the computing device 112 or the computing device 500. As part of this determination, the system may identify that the parcel 404 will be or is at chute Y 420 after sorting as a current location. The parcel 404 must be palletized at task 418 before shipping at task 408.

At 422, the process 400 includes identifying the parcel 404 is moved from the chute Y 420 to the pallet 412. In some examples, block 404 may be performed by the computing device 112 or the computing device 500. The process of palletizing the parcel 404 will locate the parcel 404 at the pallet 412 such that when the pallet ships at task 414, the parcel will ship, to complete task 408. Furthermore, the pallet 412 is located at location X at task 424. The pallet 412, parcel 404, and any other parcels are all at location X at the completion of task 424.

Referring now to FIG. 4B, at 430, when the pallet 412 is full of parcels, moving equipment stages the pallet 412 and queues it for loading to ship. In some examples, block 404 may be performed by the computing device 112 or the computing device 500. As illustrated, the parcel 404 and pallet 412 are located at location x and in order for the pallet 412 and parcel 404 to ship, the pallet must be staged at task 426 and subsequently loaded onto a vehicle at task 428 and subsequently shipped.

In some examples, in addition to the elements shown and described in process 400, additional system elements and items may be identified or associated with particular tasks. For example, a particular pallet jack may be reserved and instructed to move the pallet 412 to load as part of tasks 426 and 428. In some examples, particular personnel may be assigned to different tasks, with their particular tasks delivered to a user device associated with them, such that each user has a discrete set of tasks to complete as part of completing the overall shipping process.

Figure 5:
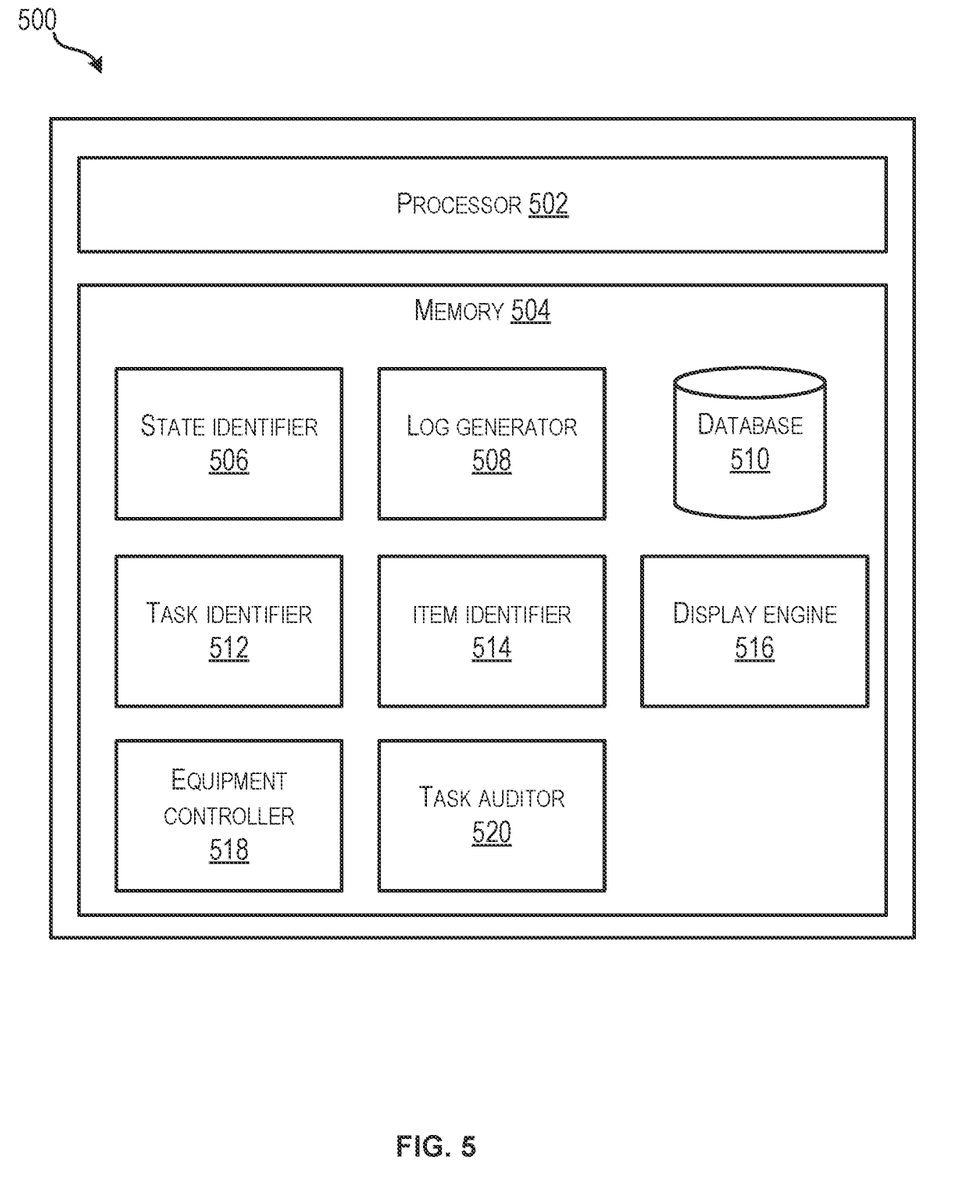
FIG. 5 depicts a block diagram of a system architecture for determining a set of intermediate tasks for an item and controlling operation of a system for carrying out the intermediate tasks, according to at least one example.

FIG. 5 depicts a block diagram of a system architecture for determining a set of intermediate tasks for an item and controlling operation of a system for carrying out the intermediate tasks, according to at least one example. In some examples, the computing device 500 may be an example of the computing device 112 or environment 700 of FIG. 7. Additionally, elements included within the computing device 500 may, in some examples be implemented as separate elements, such as individual software elements or may be implemented in a combined manner, for example with a single software package enabling the actions of one or more elements of the computing device 500.

The computing device 500 includes a processor 502 and a memory 504. The processor 502 may be a single processor or a number of processors, such as arranged in a computing system such as a server system and/or the environment 700 of FIG. 7. The memory 504 may be a non-transitory memory including instructions for carrying out different methods and steps described herein. The processor 502 may execute the instructions from the memory 504 that cause the processor 502 to perform various actions of the methods and steps.

In particular, the memory 504 may include a state identifier 506, a log generator 508, a database 510, a task identifier 512, an item identifier 514, a display engine 516, an equipment controller 518, and a task auditor 520. In some embodiments, the memory 504 may include multiple different memory devices or partitions. In some embodiments, the modules and elements described with respect to memory 504 may not be stored as independent elements or modules, but may be stored in any suitable configuration.

The item identifier 514 may identify an identify or configuration of an assembly item or may identify an item within inventory identified for shipment to fulfill a customer order. The item identifier 514 may access identifying information in response to receiving identification data from an ordering system and may also access data related to a particular configuration of an item, for example when producing one of several different configurations of an item produced by a facility.

The state identifier 506 identifies an item state out of a set of possible different item states. The item state may identify a location, a status of packaging, an assembly state, or other such status information. The state identifier 506 may also identify tasks or processes required for completion of assembly of the item or to prepare the item for shipping or delivery to the customer.

The log generator 508 may generate log information, such as log information to be stored in an audit repository such as a memory or distributed ledger. The log generator 508 may be implemented in different examples at different nodes of the system and may include logs of information for each of several sub-systems of a facility or processes involved with the processing of the item. For example, each element of a shipping or production system may include a log generator capable of generating data to store in the distributed ledger based on sensor or other associated data from each element indicating a completion of a particular instructed task. The log generator 508 may instruct recordation of the data on the distributed ledger and also confirm data on the distributed ledger. The log generator 508 may store the information in a distributed ledger for security and unalterably of the final audit log, for use in reviewing procedures after-the-fact during an audit of the process.

The database 510 may store information related to the operations associated with the items, the item identity, properties of the items, container types available, different rules established for determining intermediate tasks, and the like. For example, the rules established for different procedures in FIGS. 3-4 may be established within a rule base stored in the database. The database 510 includes information such as properties for all items, bags, carts, crates, pallet boxes, pallets, containers, and any other physical items used in the system. The properties may include the sizes, shapes, strengths, methods of transporting, methods of packing and unpacking, and other methods of interacting with each of the physical items. The database 510 also stores locations and states of items in addition to the item properties. The item locations may be updated as items are moved within the facility and/or packed within containers. The states of the items may also be stored and updated in the database 510 to reflect the current state of an item, such as the packing state, a processing state, assembly state, and other such states.

The task identifier 512 may identify a task or procedure to be performed to the item, including one or more intermediate tasks or a final task such as shipping, delivering, or completing assembly of an item. at the station. The procedure may be identified from a set of procedures, for example including procedures stored at the database 510 as part of the rule set or as part of a checklist or as an output of a machine learning algorithm that uses the rule base for training. The task identifier 512 may identify the procedure to be performed based on the item variation, item location, nesting of the item within other items, and the steps required for each part of the process and each different variation.

The display engine 516 may output data to a display, such as a display as part of the system. The display engine 516 may receive information, such as item information, instructions, item tasks, or other such information, and present such information at the station to aid in determination of the tasks to be completed for the item.

The equipment controller 518 may control operation of one or more pieces of equipment involved in processing of the item. In some examples, the equipment controller 518 may convey instructions to equipment to cause the equipment to act, for example for a robotic conveyor to convey the item to a new location, to automatically package an item in a bag, pick from a tub or chute, load a pallet in a container, or other such tasks. In some examples, the equipment controller 518 may interact with equipment systems to reserve equipment for upcoming tasks, for example, to reserve a pallet jack for use in loading a pallet into a container. In this manner, each piece of equipment managed by the system may be used efficiently. The system may therefore be useful for identifying bottlenecks in processing, for example when a lack of additional redundant pieces of equipment causes a bottleneck or alternatively when the system includes superfluous equipment that isn't needed for processing items as other equipment is more than sufficient to handle the demand.

The task auditor 520 may audit procedures performed within the system. The task auditor 520 may compare an expected time to complete a procedure against an elapsed time to audit completion of the procedure. The task auditor 520 may also receive sensor data at the exit of different stations or equipment to confirm completion of the procedure. The task auditor 520 may implement computer vision techniques to audit completion of the procedure. The task auditor 520 may audit in other ways and audit other performance of the system and store such audit information in a distributed ledger, via the log generator 508. The distributed ledger thereby becomes a complete, accurate, and verified complete history of all procedures and elements of a final product off the assembly line.

FIG. 6 depicts a block diagram depicting a process 600 for determining intermediate tasks for a particular item and carrying out such intermediate tasks, according to at least one example. Some or all of the process 600 (or any other processes described herein, or variations, and/or combinations thereof) may be performed under the control of one or more computer systems, such as by computing device 112 or computing device 500, configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

At 610, the process 600 includes receiving item information. The item information is received at the computing device 500. The item information is stored in database 510 and describes the item, may describe one or more properties of the item, such as size, shape, fragility, or other such properties. The item information may also include information related to particular unique information associated with the item. The item information includes information relating to an order for the item, the item having been purchased or requested by a remote consumer.

At 620, the process 600 includes receiving an item task. The item task is received at the computing device 500 and may be received from a remote computing device or the task identifier 512. In some examples, the item task may include packing and shipping the item for delivery to the consumer at a delivery destination by a particular date. The item task may also include other tasks related to assembly of an item, combination with other items, and other such information identifying some task to be completed with respect to the item.

At 630, the process 600 includes determining an intermediate state and intermediate location for the item. The computing device 500 determines the intermediate state using the state identifier 506. The intermediate state and intermediate location may relate to a physical and logical container assembly identifying a physical container in which the item will be placed as part of shipping, and the location may include a delivery station or route along which the item is to travel to the delivery destination. The intermediate state may describe a nested storage configuration of the item, such as described in FIG. 2, highlighting different organizational structures and states that will be used as the item is prepared for delivery to the customer. The intermediate state may describe packing within a parcel, within a bag, on a pallet, on a vehicle, or other such states.

At 640, the process 600 includes determining one or more intermediate tasks for the item. The computing device 500 determines the intermediate tasks using the task identifier 512. The intermediate tasks may be determined based on the intermediate state and intermediate location for the item. For example, an intermediate state may describe the item as included on a parcel routed to a particular delivery station. Based on such state and location information, intermediate tasks may be determined to describe processes required to transport the item to the pallet, palletize, load the pallet, and ship the pallet to the delivery location, as detailed in the example of FIGS. 4A-4B. The one or more intermediate tasks may be determined based on a user or expert-defined rule base to define associations between items in a logical space, such as an item being associated with a pallet in a tracking system, and identifying tasks from defined rules to cause the item to be loaded onto the pallet in real-world space. By identifying the intermediate states at 630, the computing device 500 may determine the intermediate tasks required to cause the item to reach each intermediate state, e.g., steps required to get the item packed in a bag, on a pallet, and loaded into a shipping container. In some examples, the intermediate tasks are determined by the computing device 500 using a rule base with expert defined rules defining each intermediate task. In some examples, the intermediate tasks may be output by a machine learning algorithm trained using input data describing item tasks and intermediate states and associated output data describing intermediate tasks and instructions for completing each intermediate task.

At 650, the process 600 includes generating instructions for completing the item task. The instructions are generated by the computing device 500, specifically by the task identifier 512. The instructions include instructions for completing the intermediate task in a sequential order as part of completing the item task. The instructions may be generated as text instructions or may be generated as instructions to cause one or more automated devices or systems to carry out tasks.

At 660, the process 600 includes providing the instructions for presentation at a display. The computing device 500 provides the instructions to the display via the display engine 516. The display may be within a facility and may include a system display or may include a user device associated with a particular individual assigned one or more of the intermediate tasks to complete. The presentation of the instructions may also include providing the instructions to robotic devices or other mechanisms to carry out the instructions.

Figure 7:
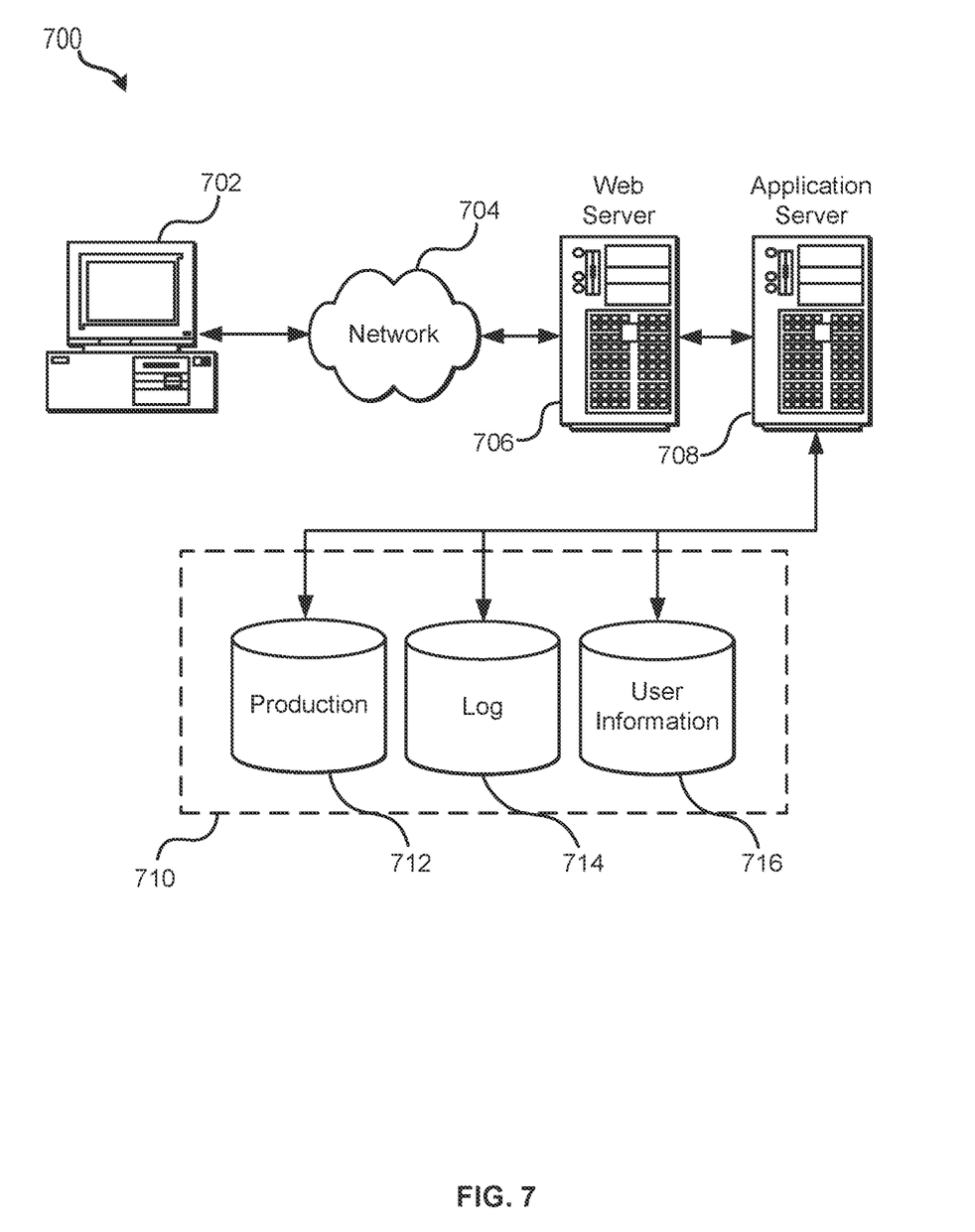
FIG. 7 illustrates an environment in which various embodiments can be implemented.

FIG. 7 illustrates aspects of an example environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any appropriate device operable to send and receive requests, messages, or information over an appropriate network 704 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 702 and the application server 708, can be handled by the Web server. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    receiving parcel information describing a current state and contents of a parcel;
    receiving a parcel task corresponding to a second state for the parcel;
    determining a container with which to associate the parcel, the container determined based on an intermediate state between the current state of the parcel and the second state for the parcel;
    determining one or more intermediate tasks for completion to prepare the parcel to transform from the current state to the second state, the one or more intermediate tasks based on the intermediate state;
    generating instructions for completing the parcel task including ordered completion of the one or more intermediate tasks as part of completing the parcel task, the instructions describing actions to be taken with respect to the parcel and a container to complete the one or more intermediate tasks; and
    providing the instructions for presentation at a display system of a user device.

2. The computer-implemented method of claim 1, wherein providing the instructions further comprises instructing one or more robotic devices to move the container.

3. The computer-implemented method of claim 1, wherein providing the instructions further comprises reserving equipment required for the one or more intermediate tasks for a performance time of the one or more intermediate tasks.

4. The computer-implemented method of claim 1, wherein determining the one or more intermediate tasks comprises:
    accessing a rule base describing parcel conditions and associated intermediate tasks to be performed in order to change a status of a particular parcel from stored at a storage location to delivered at a delivery destination;
    inputting to the rule base, parcel information comprising a current location, destination, and parcel size; and
    selecting the one or more intermediate tasks based on the inputs to the rule base.

5. A computer-implemented method, comprising:
    receiving item information describing an initial state of an item;
    receiving an item task corresponding to a final state of the item;
    determining an intermediate state for the item based on a process for transitioning the item from the initial state to the final state;
    determining one or more intermediate tasks for the item based on the intermediate state;
    generating instructions for completing the item task including ordered completion of the one or more intermediate tasks as part of completing the item task, the instructions describing actions to be taken with respect to the item; and
    instructing completion of the item task in accordance with the instructions.

6. The computer-implemented method of claim 5, wherein the one or more intermediate tasks comprise packing of the item within a package and placing the package within a container for shipment after packing the item.

7. The computer-implemented method of claim 5, wherein instructing completion of the item task comprises instructing one or more robotic devices to convey the item to an intermediate location.

8. The computer-implemented method of claim 5, wherein the initial state comprises an unassembled state, the final state comprises an assembled state, and the one or more intermediate tasks comprise assembly tasks to assemble the item.

9. The computer-implemented method of claim 8, wherein generating the instructions comprises determining one or more additional components required for the assembly tasks and the instructions further comprise instructions for requesting the one or more additional components.

10. The computer-implemented method of claim 5, wherein generating the instructions comprises determining equipment required to complete the one or more intermediate tasks.

11. The computer-implemented method of claim 10, wherein generating the instructions further comprises reserving the equipment for a performance time of the one or more intermediate tasks.

12. The computer-implemented method of claim 5, further comprising storing, at a computing device, an audit log for the item identifying (i) the item task, (ii) the one or more intermediate tasks, (iii) personnel, and (iv) equipment involved in performance of the item task and the one or more intermediate tasks.

13. The computer-implemented method of claim 5, wherein determining the one or more intermediate tasks comprises:
 accessing a rule base describing various item states and item tasks required to deliver an item in a particular item state
 inputting to the rule base, parcel information comprising the item state and item size; and
 selecting the one or more intermediate tasks based on the inputs to the rule base.

14. The computer-implemented method of claim 13, wherein the rule base is adapted based on feedback describing outcomes of item tasks and additional intermediate tasks required to perform the item tasks.

15. A system comprising:
 one or more processors; and
 a memory having executable code stored thereon that, when executed by the one or more processors, cause the one or more processors to at least:
  receive item information describing an initial state of an item;
  receive an item task corresponding to a final state of the item;
  determine an intermediate state for the item based on a process for transitioning the item from the initial state to the final state;
  determine one or more intermediate tasks for the item based on the intermediate state;
  generate instructions for completing the item task including ordered completion of the one or more intermediate tasks as part of completing the item task, the instructions describing actions to be taken with respect to the item; and
  instruct completion of the item task in accordance with the instructions.

16. The system of claim 15, further comprising a robotic transport device, and wherein the executable code comprises further code to cause the one or more processors to instruct the robotic transport device to convey the item towards a destination.

17. The system of claim 15, wherein the system comprises a packaging machine, and wherein:
 the initial state is an unpacked state;
 the final state includes a delivery destination for the item and a packaged state;
 the one or more intermediate tasks comprise packing the item using the packaging machine; and
 the executable code to provide the instructions comprises additional executable code to cause the packaging machine to pack the item.

18. The system of claim 17, wherein the one or more intermediate tasks comprise loading the item into a container after packing the item, the container selected based on a transport route of the container.

19. The system of claim 18, wherein the executable code comprises further code to cause loading equipment to transport the container to a vehicle.

20. The system of claim 15, wherein the executable code to generate the instructions comprises executable code to cause the one or more processors to:
 determine equipment required for the one or more intermediate tasks; and
 reserve the equipment for performance of the one or more intermediate tasks.

* * * * *